Dec. 11, 1962     J. F. GORDON     3,067,935
POSITION INDICATOR
Filed Nov. 21, 1957     2 Sheets-Sheet 2
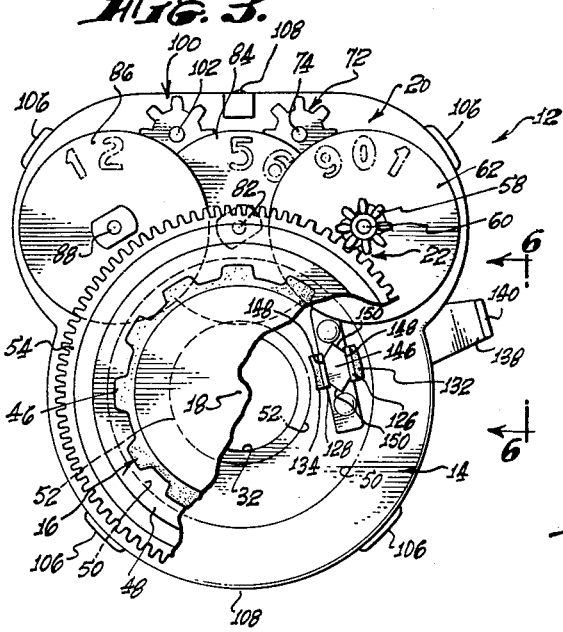
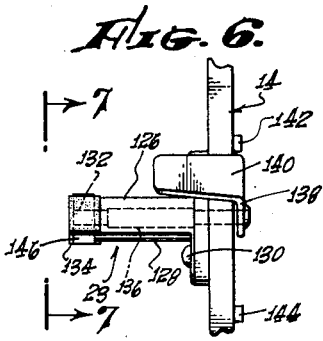
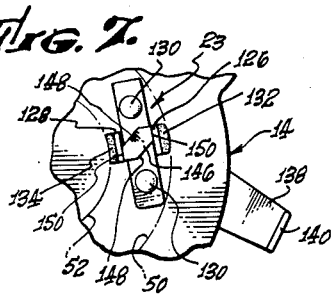
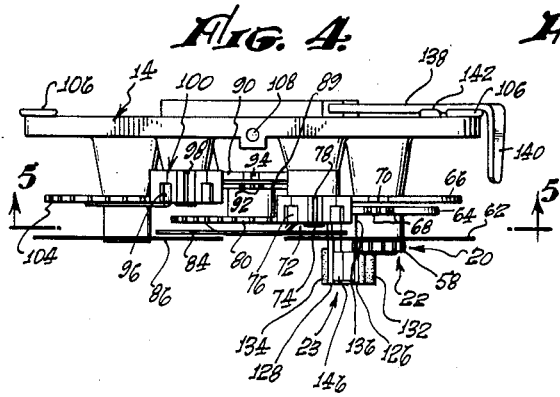
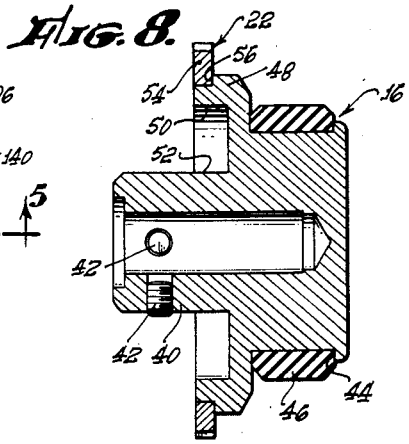
JAMES F. GORDON,
INVENTOR.
BY HIS ATTORNEYS.
HARRIS, KIECH, FOSTER & HARRIS.

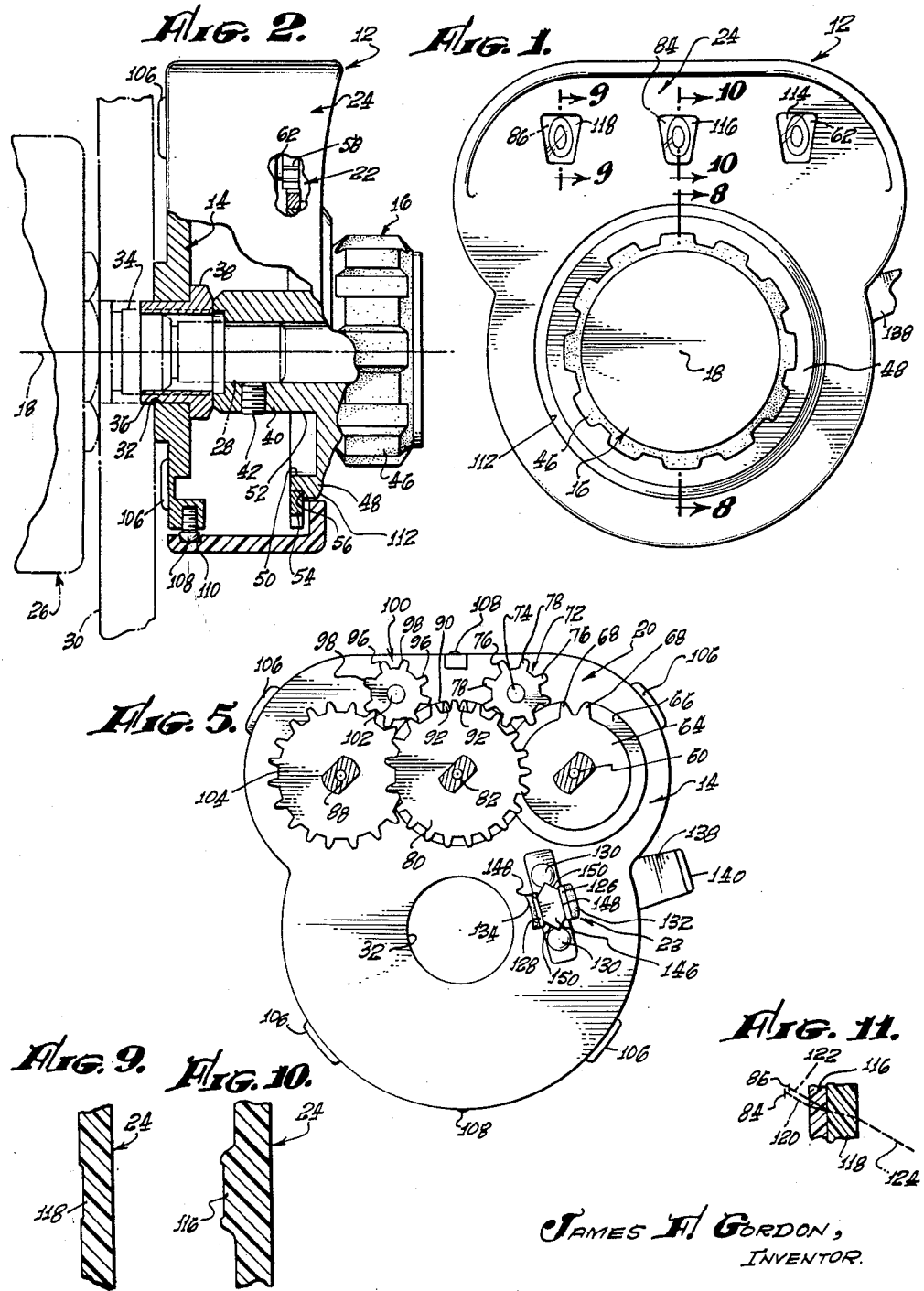

3,067,935
POSITION INDICATOR
James F. Gordon, Santa Ana, Calif., assignor to Beckman
Instruments, Inc., a corporation of California
Filed Nov. 21, 1957, Ser. No. 697,864
6 Claims. (Cl. 235—103)

The present invention relates in general to position indicators and, more particularly, to devices for performing position-controlling and/or indicating functions. More specifically, the invention is capable of controlling and/or indicating the angular position of a shaft or other rotatable element, the invention being adapted to indicate the number of revolutions and/or part of a revolution through which such element has been rotated. Also, the invention may be utilized to control and/or indicate the angular position of a member carried by the rotatable element, or to control and/or indicate the position of a member which is driven by the rotatable element, or to indicate the position of a member which drives the rotatable element. More generally, the invention may control and/or indicate the value of a variable the magnitude of which depends on the angular position of the rotatable element, or it may indicate the value of a variable which governs the angular position of the rotatable element.

The invention is of particular utility when utilized in connection with such devices as variable resistors, inductors and capacitors, for example, and the invention is considered herein as applied to a variable resistor as a matter of convenience. However, as will be readily apparent to those skilled in the art, the invention is susceptible of various other applications and it will therefore be understood that it is not to be regarded as limited to the specific application elected for consideration herein for purposes of illustration.

An important object of the invention is to provide a device which is not only adapted to be used in connection with a rotatable element, such as the shaft of a variable resistor, to indicate the angular position thereof, but which is also adapted to be used to rotate the shaft to control the angular position thereof. A related object is to provide such a device having both a manually operable control knob for varying the angular position of the shaft, or other rotatable element with which it is associated, and an indicating means for indicating accurately the angular position of the shaft, i.e., a revolution counter for counting the number of revolutions and/or part of a revolution through which the shaft has been turned.

Another object of the invention is to provide a device which includes a rotor, such as a knob, rotatable about a rotor axis and connectible to a rotatable element, such as a shaft, whose angular position is to be indicated and/or controlled, and which includes a revolution counter driven by the rotor and located to one side on the rotor axis. Another object in this respect is to provide a driving connection between the rotor and the revolution counter which merely includes a spur gear mounted on the rotor to rotate therewith about the rotor axis and a spur gear carried by the revolution counter. With this construction, the angular error between the rotor and the revolution counter due to backlash is minimized as compared to any driving connection utilizing a gear train more complex than one including only two spur gears.

A further object of the invention is to provide a device which includes a base provided with an opening therethrough and carrying the revolution counter at one side of such opening, which includes means for mounting the base on a panel with the opening in the base in alignment with a shaft projecting through the panel so that the shaft projects through the opening in the base, which includes means for mounting the rotor on the shaft forwardly of the base, and which includes a cover or housing mounted on the base and enclosing the base, the revolution counter and the driving connection between the rotor and the revolution counter, the rotor preferably being a knob which projects forwardly through an opening in the housing. With this construction, the device may be installed on the panel by first mounting the base, and the revolution counter carried thereby, on the panel, then mounting the rotor on the projecting shaft, and subsequently mounting the housing on the base. This provides a simple and straightforward sequence of assembly operations, which is an important feature.

An important object of the invention is to provide a locking means for preventing unintentional rotation of the shaft, under the influence of vibration, or the like, which includes two locking elements mounted on the base and respectively provided with shoes respectively engageable with concentric annular surfaces on the rotor which are symmetrical about the rotor axis, the rotor, as hereinbefore suggested, being a control knob in the embodiment of the invention elected for consideration herein.

Another object is to provide a locking means wherein the annular surfaces on the rotor or control knob are cylindrical surfaces which face each other, and wherein the locking elements are radially movable to engage the shoes thereon with the cylindrical surfaces.

Still another object is to provide a locking means wherein the locking elements are moved apart, to bias the shoes into engagement with the cylindrical surfaces mentioned, by a cam carried by a shaft which is rotatably mounted on the base and the axis of which is parallel to and spaced laterally from the rotor axis.

With the foregoing locking means, the rotor may be locked against rotation without applying any appreciable rotational, axial or radial forces to the rotor, which is an important feature of the invention, particularly when utilized in conjunction with an instrument such as a precision potentiometer. Another feature of the locking means hereinbefore discussed is that since the cam acts in opposite directions on two locking elements to bias the two shoes into engagement with the cylindrical surfaces of the rotor, the radial thrust forces are balanced so that the strength requirements of the shaft which rotates the cam and any means for rotating the shaft are minimized.

Another object is to provide a means for rotating the shaft which carries the cam of the locking means, comprising a lever which is long compared to the radial dimensions of the cam, thereby providing a large mechanical advantage. Another object is to provide a lever which extends radially outwardly beyond the periphery of the rotor and which follows a path closely paralleling the configuration of the base and housing so that the lever does not project excessively in any position thereof.

A further object is to provide a cam having circumferentially spaced first and second pairs of substantially diametrically opposite flats, the flats of each pair being engageable with the locking elements, respectively. The flats of the first pair are spaced apart a distance less than the spacing of the locking elements required to bias the shoes into engagement with the cylindrical surfaces of the rotor, whereby the shoes do not lock the rotor against rotation when these flats engage the locking elements. The spacing of the flats of the second pair is at least equal to the spacing of the locking elements required to bias the shoes into locking engagement with the cylindrical surfaces of the rotor, whereby to lock the rotor against rotation when the cam is in a position such that the flats of the second pair respectively engage the locking elements. In effect, this cam structure provides two detent positions, in one of which the rotor is locked and in the other of which it is unlocked. Since the cam has two definite detent positions, it cannot be moved into either of such positions unintentionally, due to the influence of vibration, or due to mishandling, or the like.

Another object of the invention is to provide locking elements which have the form of springs and which bias the shoes thereon out of engagement with the cylindrical surfaces of the rotor.

Yet another object of the invention is to provide spring locking elements which are stressed in the same direction and in the direction of their greatest strength when a turning force is applied to the rotor with the shoes on the locking elements in engagement with the cylindrical surfaces of the rotor. This object of the invention is achieved by making the spring locking elements substantially flat springs substantially parallel to the cylindrical locking surfaces on the rotor.

Another object of the invention is to provide a revolution counter including a series of indicating elements the first of which is directly connected to the rotor by the spur gears mentioned, the second of which is connected to the first by a jump gear, the third of which is connected to the second by another jump gear, and so forth, the various rotatable components of the revolution counter being rotatable about axes parallel to and spaced laterally from the rotor axis. With this construction, the angular position of the rotor may be indicated with any desired degree of accuracy. For example, the first indicating element may indicate the angular position of the rotor in hundredths of a revolution, the second may indicate the angular position thereof in tenths of a revolution, and the third may indicate the angular position of the rotor in terms of the number of revolutions it has been turned from a reference position. In this case, the jump gears mentioned rotate the second and third indicating elements one tenth of a revolution for each revolution of the first and second indicating elements, respectively.

For compactness, an object of the invention is to overlap the first, second and third indicating elements with the second indicating element located behind the first and third indicating elements.

Another object is to provide the housing of the device with refracting lenses in front of the three indicating elements to cause indicia on the indicating elements to appear to move outwardly when viewed from below, a further object in this connection being to provide the refracting lens for the second or rearmost indicating element with a greater refractive power than the refracting lenses for the first and third indicating elements so that, when viewed from below, the indicia on the three indicating elements all appear to be on the same line even though the second indicating element is partially behind the first and third indicating elements. Preferably, the refracting lens for the second indicating element is provided with a greater refractive power by making it of the same material as the refracting lenses for the first and third indicating elements, but thicker.

The foregoing objects, advantages, features and results of the present invention, together with various other objects, advantages, features and results thereof which will be apparent to those skilled in the art to which the present invention pertains in the light of this disclosure, may be achieved with the exemplary embodiment of the invention which is described in detail hereinafter and which is illustrated in the accompanying drawings wherein:

FIG. 1 is a front elevational view of an indicating and control device which embodies the invention;

FIG. 2 is a view of the device which is partially in side elevation and partially in longitudinal section;

FIG. 3 is a front elevational view of the device with a housing thereof removed and with a portion of a rotor or control knob thereof broken away;

FIG. 4 is a top plan view of the device with the housing and control knob removed;

FIG. 5 is a sectional view taken along the arrowed line 5—5 of FIG. 4;

FIG. 6 is a fragmentary side elevational view of a rotor locking means of the invention with the housing and the rotor or control knob of the device removed, FIG. 6 being taken substantially as indicated by the arrowed line 6—6 of FIG. 3;

FIG. 7 is a view taken substantially as indicated by the arrowed line 7—7 of FIG. 6;

FIG. 8 is a longitudinal sectional view of the rotor or control knob and is taken substantially as indicated by the arrowed line 8—8 of FIG. 1;

FIGS. 9 and 10 are fragmentary sectional views of refracting lenses of the device taken as indicated by the arrowed lines 9—9 and 10—10, respectively, of FIG. 1 of the drawings; and FIG. 11 is a composite fragmentary sectional view of the refracting lenses of FIGS. 9 and 10 and in effect shows such lenses superimposed for the purpose of comparing the refractive powers thereof.

The indicating and control device of the invention is designated generally by the numeral 12 throughout the drawings and includes: a base 14; a rotor 16 rotatable relative to the base about a rotor axis 18, the rotor being a control knob in the particular embodiment illustrated; a revolution counter 20 located to one side of the rotor axis and including components rotatable about axes parallel to and spaced laterally from the rotor axis as hereinafter described in detail; a driving connection 22 between the control knob and the revolution counter; locking means 23 carried by the base and engageable with the control knob for preventing rotation of the latter; and a housing 24 mounted on the base and enclosing the base, the revolution counter and the driving connection between the revolution counter and the control knob.

Referring particularly to FIG. 2 of the drawings, illustrated therein is an exemplary application of the device 12 to an apparatus 26 which may be a helical potentiometer. The apparatus 26 includes a rotatable element such as a shaft 28 which projects forwardly through a panel 30 and an opening 32 in the base 14. This shaft is journaled in a bushing 34 which forms a part of the apparatus 26, and encircling the shaft and threaded onto the bushing 34 is a nut 36 having an annular flange 38 which is seated against the forward face of the base 14. With this construction, the nut 36 threaded on the bushing 34 serves to clamp the apparatus 26 against the rearward face of the panel 30 and to clamp the base 14 against the forward face thereof.

The control knob 16 is provided with a cylindrical, tubular hub 40 which is telescoped over the forwardly projecting shaft 28 and which is suitably locked thereon, as by means of set screws 42. The knob is provided outwardly of the housing 24 with an external annular groove 44, FIG. 8, in which an annular insert 46 is disposed, this insert preferably being formed of a suitable synthetic resin and preferably being externally knurled, serrated, or otherwise roughened, to provide a gripping surface for the fingers of an operator.

The knob 16 is provided with an external annular skirt 48 having a radially-inwardly-facing cylindrical surface 50. This surface is spaced radially outwardly from a radially-outwardly-facing cylindrical surface 52 formed by the exterior of the hub 40. As will be discussed in detail hereinafter, the locking means 23 operates on the two cylindrical surfaces 50 and 52 of the control knob 16.

Considering the driving connection 22 between the knob 16 and the revolution counter 20, it includes a spur gear 54 mounted on the knob so as to rotate therewith about the rotor axis 18, the gear 54 having the form of an annulus pressed on the skirt 48 of the knob and seated against an annular shoulder 56 thereon. The spur gear 54 is meshed with a spur gear 58 which is connected to the revolution counter 20 in a manner to be described. With this construction, the two gears 54 and 58 constitute the driving connection 22 between the control knob 16 and the revolution counter 20. This minimizes the angular error between the shaft 28 and the revolution counter 20 by minimizing backlash, as compared to other driving connections utilizing more gears, or other elements.

Considering the revolution counter 20, the gear 58 is rotatably mounted on a shaft 60 which is spaced laterally from and which is parallel to the shaft 28, the shaft 60 being mounted on the base 14. Connected to the gear 58 and rotatably mounted on the shaft 60 is a first indicating element 62 having the form of a dial bearing the indicia "0" to "9." In the particular construction illustrated, the gear ratio between the gears 54 and 58 is 10:1 so that the indicia on the dial 62 designate the angular position of the knob 16, and the shaft 28, relative to a reference position in hundredths of a revolution.

Connected to the gear 58 and the dial 62 and rotatably mounted on the shaft 60 are discs 64 and 66, the former having two gear teeth 68 projecting radially outwardly from its periphery and the latter having a notch 70 projecting radially inwardly from its periphery and axially aligned with the space between the two gear teeth 68. Adjacent the discs 64 and 66 is a jump gear 72 which is rotatably mounted on a shaft 74 carried by the base 14 and paralleling the shafts 28 and 60. The jump gear 72 is provided with short and long teeth 76 and 78 arranged in alternating relation circumferentially thereof, all the teeth 76 and 78 being adapted to mesh with the two teeth 68 on the disc 64 and only the long teeth 78 being adapted to mesh with the notch 70 in the disc 66.

Considering the operative relationship between the discs 64 and 66 and the jump gear 72, once each revolution of the dial 62 the leading tooth of the gear teeth 68 on the disc 64 engages one of the short teeth 76 on the jump gear 72 and rotates the jump gear sufficiently to insert an adjacent long tooth 78 between the gear teeth 68 and into the notch 70. Continued rotation of the dial 62 results in further rotation of the jump gear 72 to remove the long tooth 78 in question from between the gear teeth 68 and from the notch 70. Thus, for each revolution of the dial 62, the jump gear 72 is rotated through an angle equal to the angle subtended by two adjacent long teeth 78, or two adjacent short teeth 76. When the gear teeth 68 on the disc 64 and the notch 70 in the disc 66 are circumferentially spaced from the jump gear 72, rotation of the jump gear is prevented by engagement of two adjacent long teeth 78 with the periphery of the disc 66, as will be apparent from FIG. 5 of the drawing.

Both the short teeth 76 and the long teeth 78 on the jump gear 72 are meshed with a gear 80 rotatably mounted on a shaft 82 paralleling and spaced laterally from the shafts 28, 60 and 74. Fixed to the gear 80 is an indicating element 84, shown as a dial having the indicia from "0" to "9" thereon. The gear ratio between the discs 64 and 66 and the jump gear 72 and the gear ratio between the jump gear 72 and the gear 80 are such that the dial 84 is rotated 1/10 of a revolution for each revolution of the dial 62. Thus, since the dial 62 indicates the angular position of the shaft 28 relative to a reference position in hundredths of a revolution, the dial 84 indicates the angular position thereof relative to such reference position in tenths of a revolution.

The revolution counter 20 also includes a third indicating element 86 having the form of a dial with the indicia "0" to "9" thereon, this dial being rotatably mounted on a shaft 88 carried by the base 14 and paralleling and spaced laterally from the shaft 28, 60, 74 and 82. The dials 84 and 86 are interconnected in such a manner that each revolution of the dial 84 produces 1/10 of a revolution of the dial 86. Consequently, the dial 86 indicates the whole number of revolutions the shaft 28 has been turned from the reference position. The interconnection between the dial 84 and the dial 86 includes discs 89 and 90 connected to and rotatable with the dial 84 and the gear 80 about the shaft 82. The disc 89 is identical to the disc 64 and is provided with two radially-outwardly-extending gear teeth 92 thereon. The disc 90 is identical to the disc 66 and is provided with a radially-inwardly-extending notch 94 therein which is aligned with the space between the gear teeth 92. The gear teeth 92 are adapted to mesh with short and long teeth 96 and 98 on a jump gear 100 which is rotatably mounted on a shaft 102 spaced from parallel to the shafts 28, 60, 74, 82 and 88. The notch 94 in the disc 90 is adapted to mesh with the long teeth 98 on the jump gear 100. Both the short teeth 96 and the long teeth 98 on the jump gear 100 are in mesh with a gear 104 which is rotatably mounted on the shaft 88 and which is connected to the dial 86. The operation of the interconnection between the dial 84 and the dial 86 is identical to that of the interconnection between the dial 62 and the dial 84 so that a further description is unnecessary, the net result being that the dial 86 is rotated through 1/10 of a revolution for each revolution of the dial 84, in the same manner that the dial 84 is rotated through 1/10 of a revolution for each revolution of the dial 62.

Considering the housing 24, it is telescoped over the periphery of the base 14 and is seated against ears 106 which project outwardly from the base. The base 14 is provided with two detents 108 which fit into recesses 110 in the housing 24 to retain the housing on the base, one of the detents 108 and the corresponding recess 110 being illustrated in detail in FIG. 2 of the drawings. The housing 24 is formed of a material, such as a suitable synthetic resin, which is sufficiently flexible to permit the rearward edge of the housing to be snapped over the detents 108 as it is seated against the ears 106. Thus, the housing 24 is telescoped over the base 14 with a snap action. The knob 16 projects forwardly through an opening 112 in the front wall of the housing 24, the housing enclosing the base 14, the revolution counter 20, the driving connection 22 between knob 16 and the revolution counter, and the locking means 23, the latter being described hereinafter.

With the foregoing construction of the base 14, the knob 16 and the housing 24, a logical and straightforward sequence of assembly operations results, which is an important feature. More particularly, the apparatus 26 and the base 14 are clamped to the panel 30 by the nut 36 in the manner hereinbefore described, the base having the revolution counter 20 and the locking means 23 mounted thereon prior to clamping it to the panel 30. Next, the knob 16 with the driving gear 54 thereon is telescoped over the shaft 28, the driving gear 54 simultaneously being meshed with the gear 58 of the revolution counter 20. After adjusting the angular position of the knob 16 relative to the shaft 28 to provide a desired reference position, the knob is locked to the shaft 28 by means of the set screws 42. The reference position mentioned may be such as to position the indicia "0" on the dials 62, 84, and 86 at the tops of the paths of rotational movement of such dials when the shaft 28 is in a predetermined position, which may correspond to one end of the range of travel of an element, not shown, driven by the shaft 28. The final step in the assembly of the device 12 is to snap the housing 24 into place over the base 14. Thus, mounting and assembly of the device 12 basically comprises three simple steps, viz., mounting of the base 14 on the panel 30 mounting of the knob 16 on the shaft 28, and mounting of the housing 24 on the base 14, which is an important feature of the invention.

Those indicia on the dials 62, 84 and 86 which are at the tops of the paths of rotational movement of the dials are visible from the front of the device 12 through lenses 114, 116 and 118, respectively, carried by the housing 24. Preferably, these lenses are integral with the housing 24, the latter being formed of a transparent synthetic resin which is painted, or otherwise treated, to render it opaque, except in the areas of the lenses.

To render the revolution counter more compact, the dials 62, 84 and 86 are arranged in overlapping relation with the middle dial 84 located slightly rearwardly of the dials 62 and 86. This rearward location of the dial 84 produces a condition of parallax which tends to cause the top indicium on the middle dial to appear to be below the top indicia of the dials 62 and 86 when the dials are viewed from below. To correct this parallax, the middle lens 116 is provided with a greater refractive power than the lenses 114 and 118. In the preferred construction illustrated, this greater refractive power is provided by making the middle lens 116 sufficiently thicker than the lenses 114 and 118 to cause the top indicium on the middle dial to appear to be on the same level as the top indicia on the dials 62 and 86 when these dials are viewed from below. FIG. 11 of the drawings illustrates diagrammatically how making the lens 116 thicker than the lens 118 has the effect of causing the two dials 84 and 86 to appear on the same level, even when viewed from below, by merging image paths 120 and 122 associated therewith into a single image path 124 forwardly of the lenses.

Considering the locking means 23 now, it includes two spring locking elements 126 and 128 which are substantially flat and which are disposed adjacent and substantially parallel to the cylindrical surfaces 50 and 52, respectively, of the knob 16. Actually, the two locking elements 126 and 128 are the arms of a generally U-shaped spring the base of which is secured to the base 14, as by screws 130, in such a manner that the two locking elements 126 and 128 extend parallel to the rotor axis 18 and project into the annular space between the cylindrical surfaces 50 and 52 of the knob. The locking elements 126 and 128 are provided with shoes 132 and 134, respectively, which are frictionally engageable with the cylindrical surfaces 50 and 52, respectively, of the knob 16, these shoes being biasable radially outwardly and radially inwardly, respectively, into frictional engagement with the cylindrical surfaces 50 and 52, respectively, to lock the knob 16 and hence the shaft 28, against rotation.

Considering how the shoes 132 and 134 are biased into engagement with the cylindrical surfaces 50 and 52 to lock the knob 16 against rotation, disposed between the locking elements 126 and 128 and paralleling the rotor axis 18 is a shaft 136 which is rotatably mounted on the base 14 and which is adapted to be turned by a lever or lever arm 138. The latter is fixed to the shaft 136 rearwardly of the base 14 and projects laterally from behind the base, being provided at its outer end with a finger piece 140 by means of which it may be swung between limiting stops 142 and 144 on the base. The path of travel of the finger piece 140 generally follows the external configuration of the base 14 and the housing 24 thereadjacent to minimize the over-all dimensions of the device 12.

Carried by the shaft 136 between the locking elements 126 and 128 substantially in alignment with the shoes 132 and 134 thereon is a cam 146 having a first pair of substantially diametrically opposite flats 148 and a second pair of substantially diametrically opposite flats 150, the pair of flats 150 being circumferentially spaced from the pair of flats 148. When the lever 138 is in engagement with the stop 142, the flats 148 are in engagement with the locking elements 126 and 128, respectively, the inherent resilience of these locking elements biasing them into engagement with the flats 148. The spacing of the flats 148 is less than the spacing of the locking elements 126 and 128 necessary to bias the shoes 132 and 134 into engagement with the cylindrical surfaces 50 and 52, respectively. Consequently, when the flats 148 engage the locking elements 126 and 128, the shoes 132 and 134 are out of locking engagement with the cylindrical surfaces 50 and 52, respectively, of the control knob 16 so that the knob is free to rotate to change the angular position of the shaft 28.

However, when the lever 138 is moved into engagement with the stop 144, the cam 146 is rotated into a position such that the flats 150 respectively engage the locking elements 126 and 128. The spacing between the flats 150 is at least equal to the spacing between the locking elements 126 and 128 required to bias the shoes 132 and 134 into frictional locking engagement with the cylindrical surfaces 50 and 52, respectively. Consequently, for this angular position of the cam 146, the knob 16 is locked against rotation.

The foregoing structure of the locking means 23 provides a number of important advantages. First, the locking means requires a small space and thus may, in effect, be housed within the knob 16 as disclosed so as to minimize the over-all dimensions of the device 12.

Another advantage of the locking means 23 is that the double detent action provided by the two pairs of flats 148 and 150 positively insures against unintentional movement of the cam 146 from its unlocked position to its locked position, or vice versa. Consequently, the locking means 23 cannot become either locked or unlocked accidentally under the influence of vibration, mishandling, or the like.

Since the locking elements 126 and 128 are springs which bias the shoes 132 and 134 away from the cylindrical surfaces 50 and 52 of the knob 16, the shoes are automatically disengaged from the surfaces when the cam 146 is rotated into a position corresponding to the unlocked condition of the locking means 23. Further, this spring action of the locking elements 126 and 128 tends to keep the lever 138 in its released position.

Since the locking elements 126 and 128 are flat springs substantially paralleling the cylindrical surfaces 50 and 52, and since both are located on the same side of the rotor axis 18, both of the locking elements receive any forces tending to produce rotation of the knob 16 when the locking means is locked in the same direction and in the direction of the greatest strength of the locking elements.

Still another advantage of the locking means 23 is that the cam 146 is disposed directly between the locking elements 126 and 128 and acts to bias the shoes 132 and 134 radially outwardly and radially inwardly, respectively, whereby the forces acting on the cam 146 as it is rotated into the locking position are balanced. Consequently, it is not necessary for the shaft 136 and the lever 138 to resist large lateral forces, it being necessary for these elements to resist only the torsional force required to rotate the cam.

Yet another important advantage of the locking means 23 is that when the knob 16 is locked or unlocked, no rotational force is applied thereto because of the use of the radially acting shoes 132 and 134. Also, no axial force is applied to the knob 16 as it is locked or unlocked, again due to the radial movement of the shoes 132 and 134. Further, because of the use of the two shoes 132 and 134 acting in opposite radial directions, no lateral or radial force is applied to the knob 16 as it is locked or unlocked. Thus, the locking means 23 completely avoid the application to the knob 16, and the shaft 28, of any lateral forces, axial forces, or rotational forces. This is particularly important when the device 12 is utilized in connection with an apparatus 26 such as a precision helical potentiometer, since the avoidance of forces of this nature is an important factor in prolonging the life of such an apparatus.

As previously stated, the housing 24 is preferably a transparent plastic and it is rendered opaque, except for the lenses 114, 116, and 118, by painting or otherwise coating it internally. This results in a rich external appearance without glazing or polishing the exterior of the housing, due to the fact that the internal opaque coating is viewed through the transparent housing. Also the internal coating cannot become scratched in use. The housing 24 and the knob insert 46 may be color matched, or may be in contrasting colors.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:

1. In combination: a rotor rotatable about a rotor axis; a spur gear connected to said rotor and rotatable therewith about said rotor axis; and a revolution counter located to one side of said rotor axis and including a first disc shaped indicating dial rotatable about a first axis and having numbered indicia near the outer periphery of one of its planar faces, another spur gear concentric with said first axis directly connected to said first indicating dial and meshed with the spur gear first mentioned, and a second disc shaped indicating dial rotatable about a second axis parallel to said first axis, and having numbered indicia near the outer periphery of one of its planar faces, said second indicating dial being inter-connected with said first indicating dial and being positioned rearwardly of said first indicating dial, so that said first dial overlaps said second dial; a cover mounted on said base and enclosing said revolution counter, said cover having substantially in-line windows in front of said first and second dials through which only a single number indicia of each dial is visible; and means for rotating said shaft comprising a manually operable control knob mounted on said shaft and extending outwardly in front of said cover below said substantially in-line windows so that the control knob may be freely manually rotated without covering said windows or running into said cover.

2. In a device for indicating the angular position of a shaft which extends through a panel, the combination of: a base provided with an opening therethrough for the shaft; means for connecting said base to the panel with a shaft projecting through said opening in said base; a revolution counter mounted on said base at one side of said opening therein and including a first disc shaped indicating dial rotatable about a first axis and having numbered indicia near the outer periphery of one of its planar faces, a spur gear concentric with said first axis directly connected to said first indicating dial, a second disc shaped indicating dial rotatable about a second axis parallel to said first axis and having numbered indicia near the outer periphery of one of its planar faces, said second indicating dial being interconnected with said first indicating dial and being positioned rearwardly of said first indicating dial so that said first dial overlaps said second dial; a cover formed of sufficiently flexible material so as to be snapped on said base and enclosing said base, said revolution counter and said spur gears, said cover having substantially in-line windows in front of said first and second dials through which only a single number indicia of each dial is visible; means for rotating said shaft comprising a manually operable control knob mounted on said shaft and extending outwardly in front of said cover below said substantially in-line windows so that the control knob may be freely manually rotated without covering said windows or running into said cover; and means including a second spur gear on said control knob meshed with said first spur gear of said revolution counter for communicating rotation of said control knob to said revolution counter.

3. In combination: a base; a rotor rotatable relative to said base about a rotor axis, said rotor being provided with two concentric annular surfaces symmetrical about said rotor axis; two locking elements carried by said base and respectively provided with shoes respectively engageable with said annular surfaces; a shaft rotatably mounted on said base; and a cam carried by said shaft and disposed between said locking elements for biasing said shoes into engagement with said annular surfaces, respectively, said cam having a first pair of substantially diametrically opposite flats respectively engageable with said locking elements in a first position of said cam, and having a second pair of substantially diametrically opposite flats respectively engageable with said locking elements in a second position of said cam, said pairs of flats being spaced apart circumferentially of said cam, the distance between said flats of said first pair being less than the spacing between said locking elements required to bias said shoes into engagement with said annular surfaces so that said shoes are out of engagement with said annular surfaces when said flats of said first pair are in engagement with said locking elements, and the spacing between said flats of said second pair being at least equal to the spacing of said locking elements required to bias said shoes into engagement with said annular surfaces so that said shoes engage said annular surfaces when said flats of said second pair engage said locking elements.

4. In combination: a base; a rotor rotatable relative to said base about a rotor axis, said rotor having an annular surface symmetrical about said rotor axis; a locking element carried by said base and provided with a shoe engageable with said annular surface; a shaft rotatably mounted on said base; and a cam carried by said shaft and engageable with said locking element to bias said shoe into engagement with said annular surface, said cam having a first flat engageable with said locking element and spaced from the axis of rotation of said shaft a distance insufficient to bias said shoe into engagement with said annular surface, and having a second flat circumferentially spaced from said first flat and engageable with said locking element and spaced from the axis of rotation of said shaft a distance sufficient to bias said shoe into engagement with said annular surface.

5. In combination: a first indicating element; a second indicating element positioned rearwardly of said first indicating element; a housing enclosing said indicating elements; a first refracting lens carried by said housing and positioned in front of said first indicating element and through which said first indicating element may be viewed; and a second refracting lens carried by said housing and positioned in front of said second indicating element and through which said second indicating element may be viewed, said second refracting lens being of the same material as but thicker than said first refracting lens to provide said second refracting lens with a greater refractive power than said first refracting lens.

6. In combination: a base; a rotor rotatable relative to said base about a rotor axis, said rotor being provided with two concentric annular surfaces, symmetrical about said rotor axis; and a locking means comprising a pair of substantially flat springs carried by said base substantially parallel to said annular surfaces, brake shoes respectively engageable with said annular surfaces affixed to each of said springs; a shaft rotatably mounted on said base, and a cam carried by said shaft and disposed between said springs for biasing said shoes into engagement with said annular surfaces, respectively.

References Cited in the file of this patent

UNITED STATES PATENTS

| | | |
|---|---|---|
| 801,205 | Beal | Oct. 10, 1905 |
| 1,100,278 | Zipser | June 16, 1914 |
| 1,509,523 | Monosmith | Sept. 23, 1924 |
| 1,511,976 | Markham | Oct. 14, 1924 |
| 2,119,576 | Goldstine | June 7, 1938 |
| 2,541,161 | Harper | Feb. 13, 1951 |
| 2,738,757 | Willyard et al. | Mar. 20, 1956 |
| 2,746,417 | McCord et al. | May 22, 1956 |
| 2,777,637 | Matthew | Jan. 15, 1957 |
| 2,854,659 | Haines | Sept. 30, 1958 |
| 2,901,998 | Keith | Sept. 1, 1959 |
| 2,916,569 | Fackler et al. | Dec. 8, 1959 |
| 2,979,258 | Van Alen | Apr. 11, 1961 |

FOREIGN PATENTS

| | | |
|---|---|---|
| 294,904 | Great Britain | Sept. 27, 1928 |